(12) United States Patent
Amir (10) Patent No.: US 11,182,657 B2
(45) Date of Patent: Nov. 23, 2021

(54) COMBINED IMAGES AND MACHINE READABLE GRAPHIC CODES

(71) Applicant: Hewlett-Packard Development Company, L.P., Spring, TX (US)

(72) Inventor: Gideon Amir, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/051,098

(22) PCT Filed: Aug. 17, 2018

(86) PCT No.: PCT/US2018/046958
§ 371 (c)(1),
(2) Date: Oct. 27, 2020

(87) PCT Pub. No.: WO2020/036605
PCT Pub. Date: Feb. 20, 2020

(65) Prior Publication Data
US 2021/0232880 A1     Jul. 29, 2021

(51) Int. Cl.
*G06K 19/06* (2006.01)
*B41M 1/22* (2006.01)
*H04N 1/60* (2006.01)

(52) U.S. Cl.
CPC ......... *G06K 19/06103* (2013.01); *B41M 1/22* (2013.01); *G06K 19/06037* (2013.01); *H04N 1/6016* (2013.01)

(58) Field of Classification Search
CPC ....... G06K 19/06103; G06K 19/06037; B41M 1/22; H04N 1/6016
See application file for complete search history.

(56) References Cited

U.S. PATENT DOCUMENTS

| | | |
|---|---|---|
| 7,491,424 B2 | 2/2009 | Hersch |
| 9,497,356 B1 | 11/2016 | Pjanic |
| 2002/0092915 A1* | 7/2002 | Marchand ................ G06K 7/12 235/494 |
| 2005/0109846 A1* | 5/2005 | Lubow ............ G06K 19/06028 235/462.01 |
| 2008/0002853 A1 | 1/2008 | Kawabe |
| 2013/0021364 A1 | 1/2013 | Azuma |
| 2013/0215473 A1 | 8/2013 | Fan |
| 2018/0025263 A1 | 1/2018 | Toyoizumi |

FOREIGN PATENT DOCUMENTS

| | | |
|---|---|---|
| CN | 106778996 | 5/2017 |
| JP | 2012141729 | 7/2012 |
| WO | WO-2017060761 | 4/2017 |

* cited by examiner

*Primary Examiner* — Laura A Gudorf
(74) *Attorney, Agent, or Firm* — HP Inc. Patent Department (57) ABSTRACT

In an example, a method includes receiving, at a processor, a digital version of an image combined with a machine readable graphic code. Areas of the combined image and graphic code that have a lightness level below a threshold level may be determined. Print instructions for depositing a metallic pattern wherein solid areas of the metallic pattern correspond to the areas of the combined image and graphic code that have a lightness level below the threshold level may also be determined.

15 Claims, 8 Drawing Sheets

COMBINED IMAGES AND MACHINE READABLE GRAPHIC CODES

BACKGROUND

Machine readable graphic codes are representations of data which are readable by a machine via optical means. Examples of machine readable graphic codes are one-dimensional barcodes, and two-dimensional barcodes.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Machine readable graphic codes optically represent data for reading by a device, such as a barcode scanner, or a camera in combination with a processor comprising a suitable program for decoding the code. In some examples, a machine readable graphic code may be printed onto a print medium or substrate and affixed to an item. The code may, in some examples, encode information about the item to which it is affixed.

In examples, machine readable graphic codes comprise a plurality of relatively light areas ('light areas') and a plurality of relatively dark areas ('dark areas'). The information encoded by the code is contained in the positioning of the light areas and the dark areas. Such machine readable graphic codes may be referred to as binary machine readable graphic codes. Example types of machine readable codes are one-dimensional, 1D, barcodes, and two-dimensional, 2D, barcodes. 2D barcodes may also be referred to as matrix codes. In a 1D barcode, information may be encoded in the thickness and spacing between parallel lines, which are separated by white lines. A machine readable code may also in some examples contain optical representations of numbers, for example as Arabic numerals. For example, a Universal Product Code, UPC, barcode may comprise optically represented numerals. An example 2D barcode may represent data via a plurality of areas which may be rectangles, dots, hexagons, and/or other geometric patterns. In an example, a 2D barcode, or matrix code, may comprise a plurality of black areas separated by a plurality of white areas, wherein the information encoded by the code is determinable from the shaping and the spacing of the areas. An example of a 2D barcode is a Quick Response, QR, code. Other examples of 2D barcodes are Data Matrix, DM, codes and DotCodes. A machine readable code may comprise a plurality of positioning features, for example a QR code may comprise one positioning feature in each of three corners of a 2D code having four corners, in order to provide an alignment calibration to a machine reading the code. A graphic code may comprise error correction features, such as redundant information-carrying areas of the code, which act to correct errors in reading the code should other areas of the code be unreadable. The provision of error correction features may allow for areas of a generated code to be omitted or modified without rendering the code unreadable.

In some examples, a machine readable graphic code may form part of a mobile payment system. For example, a user may scan a machine readable code such as a QR code with their phone to transfer money to the owner of the QR code.

Figure 1A:
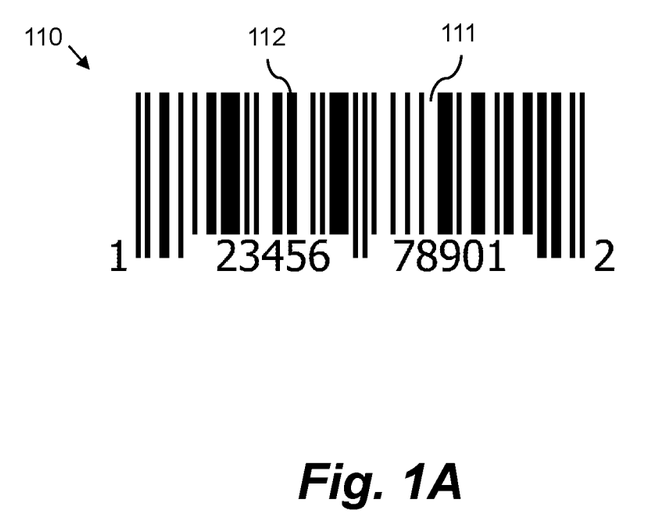
FIG. 1A shows an example machine readable graphic code.
Figure 1B:
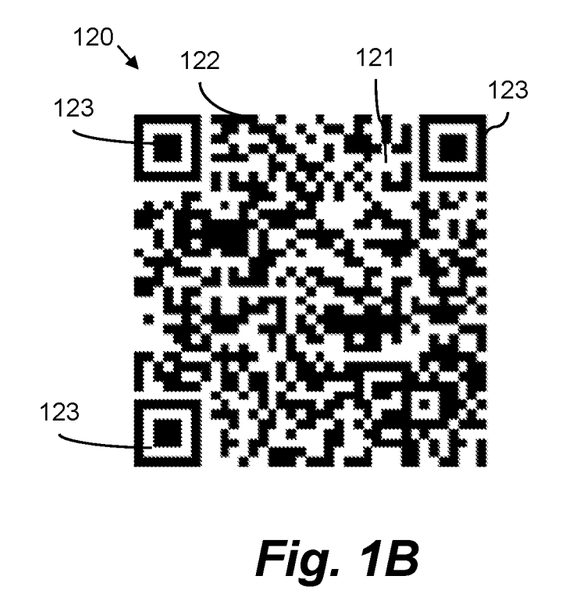
FIG. 1B shows another example machine readable graphic code.

FIG. 1A shows a first example machine readable graphic code 110. The graphic code shown in FIG. 1B is a 1D barcode comprising a plurality of parallel black lines 112 comprising black pixels and a plurality of white spaces 111 comprising white pixels. In addition, human-readable numbers are shown.

FIG. 1B shows a second example machine readable graphic code 120. The graphic code shown in FIG. 1B is a 2D code, namely a QR code, comprising a plurality of white areas 121 comprising light pixels and a plurality of black areas 122 comprising black pixels. The graphic code 120 in this example encodes a hyperlink to https://www8.hp.com/us/en/home.html. The graphic code 120 has been generated with an error correction level of 30%. The graphic code 120 comprises a plurality of alignment features 123.

As mentioned above, machine readable graphic codes may comprise a plurality of lighter, or white, areas, and a plurality of darker, or black, areas. Since a machine graphic code is displayed optically, it can be visible to a user, for example when affixed to a product, or displayed on a device display. A machine readable graphic code may be combined with an image to produce a combination of the image and the graphic code which displays visual characteristics of an image to a user, while allowing the code to be read by a machine, for example, by using the same image for both the light areas and the dark areas of the machine readable graphic code.

In some examples, an image may comprise any display or color specification for the machine readable graphic code, such as a non-default color, or a non-monochrome color (e.g. the darker areas may be specified to be non-black). In some examples an image may comprise a graphical feature which comprises a color variation, for example including different or variable colors over its surface. In such an example, a machine readable graphic code combined with an image may comprise at least three colors (which may be of the same or different hues). In some examples, an image may comprise, for example text, graphics, a picture, a shape and/or a pattern.

The combination of graphic code and image may also be referred to as a modified image or the combined image in some examples.

Figure 2A:
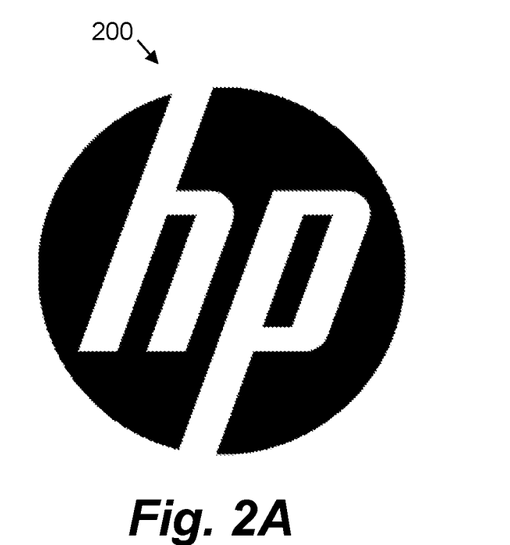
FIG. 2A shows an example image to be combined with an example machine readable graphic code.
Figure 2B:
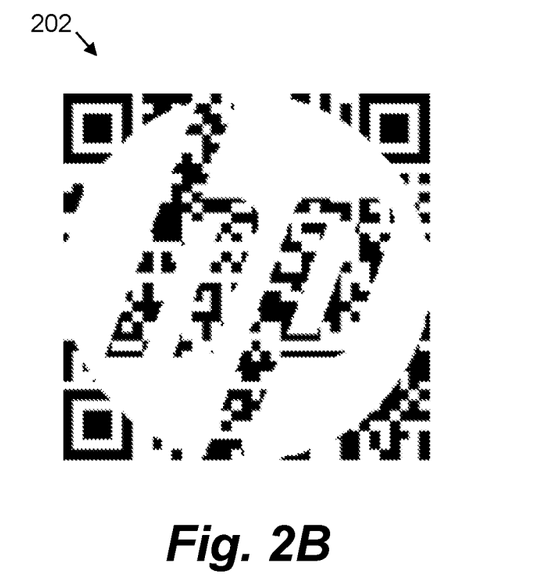
FIG. 2B shows a schematic representation of an example combination of the machine readable graphic code shown in FIG. 1B and the image shown in FIG. 2A.

FIG. 2A shows an example of an image 200 and FIG. 2B shows a modified image 202 resulting from a combination of image 200 with the machine readable graphic code 120 of FIG. 1B. The modified image 202 is a schematic representation shown in black and white and thus does not show pixel values which may be present in a combination graphic code and image, and which may reflect non-black and/or variable colors. For example, the combination of the graphic code and the image in modified image 202 does not show the degrees of lightness, and/or other pixel parameters, such as RGB values, or hue and saturation values, which may be present in a combination graphic code and image and, for example, does not show a portion of the areas corresponding to dark areas of the graphic code which may be visible in a combination graphic code and image. In examples, the machine readable graphic code may be generated with an error correction level taking into account readability of the combination of the code and image. For example, the error correction level may be set taking into account the contrast which will be set in the resulting modified combination of code and image. An example method for producing a combination graphic code and image such as that shown in FIG. 2B is discussed in more detail below with reference to FIGS. 8A and 8B. By sacrificing some error correction, empty spaces may be provided, which in turn allow the shape(s) of the image to be clearly delineated.

Figure 3:
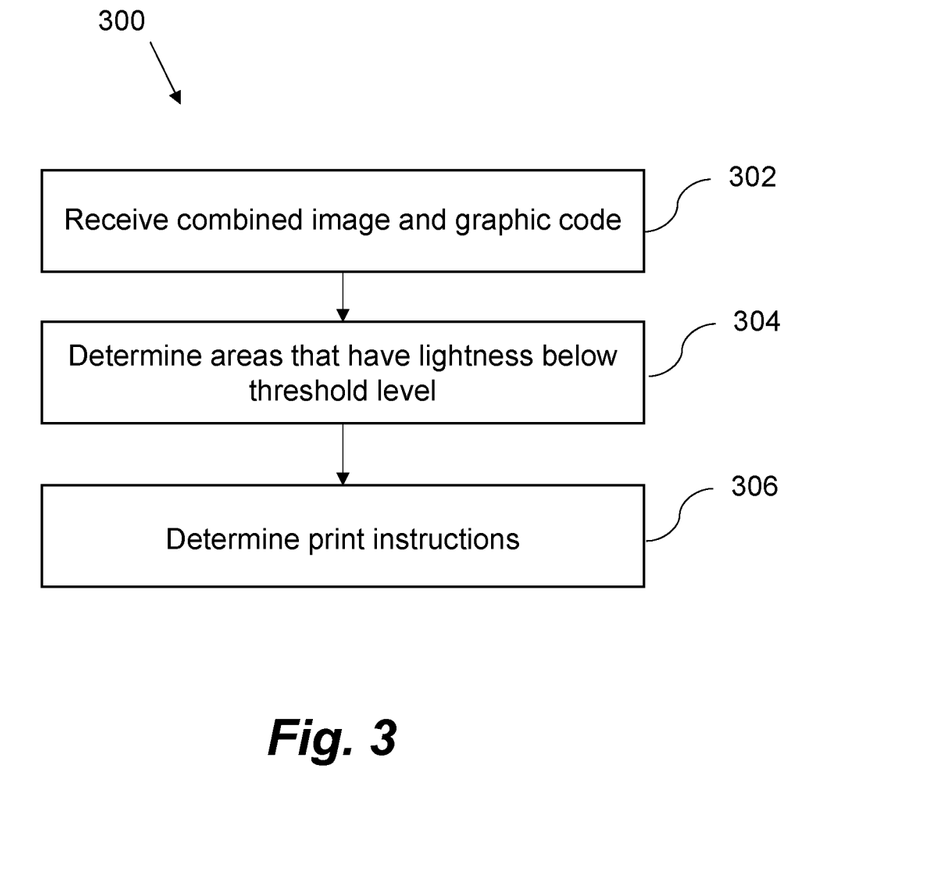
FIG. 3 shows a flowchart of an example method of producing a combined image and graphic code.

FIG. 3 shows an example method 300, which may be a computer implemented method and/or may be a method for producing a combined image and machine readable graphic code with a metallic effect. The method 300 comprises, at block 302, receiving a digital version of an image combined with a machine readable graphic code (i.e. a version of the combined image and code represented in data). For example, block 302 may comprise receiving a combined image and graphic code such as the modified image 202 shown in FIG. 2B. In some examples, the digital version of an image combined with a machine readable graphic code may be received from a memory, or remotely over a communications interface. In some examples, the processor may receive the combined image by deriving the digital version of an image combined with a machine readable graphic code, for example using techniques set out in relation to FIGS. 8A and 8B below.

Block 304 comprises determining areas (i.e. pixels) of the combined image and graphic code that have a lightness level (or luminance) below a threshold level. The threshold level may be a predetermined threshold which is set at a level less than or equal to the lightness level of a metallic print agent pattern to be deposited underneath (or in some examples, for example where the image is to be printed on a transparency, and viewed therethrough, on top of) the combined image and graphic code during printing. In other words, block 304 identifies relatively dark areas of the combined image. In some examples, this may comprise all of the dark areas of the combined image—i.e. the dark regions of a graphic code. However, in other examples, one of which is described in greater detail below with reference to FIGS. 8A and B, each of the 'darker' and/or the lighter areas may vary in lightness (as well as, in some examples, color value) across the image. Therefore selected instances of such areas may be identified in block 304.

Block 306 comprises determining print instructions for depositing the metallic print agent pattern, so that the determined areas of the combined image and graphic code that have a lightness below the threshold level are to be co-located with solid areas of the metallic print agent pattern when printed, i.e. solid areas of the metallic print agent pattern correspond to the areas of the combined image and graphic code that have a lightness level below the threshold level.

A metallic effect is achieved in a printed combined image and graphic code by depositing/printing metallic print agent (for example a 'metallic ink') on a substrate to form a metallic pattern before depositing the image over the metallic pattern. The metallic print agent may comprise a print agent layer having a metallic effect caused by specular reflection from the metallic print agent. In the print instructions, the areas where metallic print agent is to be distributed are to be located underneath (in a viewing direction) areas of the combined image and graphic code that have a lightness level below the threshold. Therefore a metallic pattern is defined so that metallic print agent is deposited underneath darker areas of the combined image and graphic code and not under lighter areas. This means that the color of the metallic pattern does not overpower the original color(s) of the combined image. The threshold may be set at a level so as to provide a trade-off between achieving a more metallic look and maintaining more pixels with the original colours of the image. Setting the threshold at a lower lightness level (closer to black) will reduce the total number of pixels of the combined image and graphic code that will be also printed with the metallic pattern (maintaining more of the original colors of the image) whereas setting a higher threshold (closer to white) will increase the number of pixels that will also be printed with the metallic pattern, increasing the metallic look effect but reducing the number of pixels having the original color of the image.

In some examples, the threshold level may be set at a lightness value between a 0.20 and 0.30 less than the lightness level of the metallic pattern when deposited on a substrate, where a lightness value of 0 represents black and a lightness value of 1 represents white. In some examples, the metallic pattern may be formed of silver print agent which, when deposited, may have a lightness level of 0.75. In some examples, the threshold level may be set at 0.5, i.e. 0.25 less than the lightness level of the silver print agent.

Setting the threshold level in this way has been found to provide a balance between providing a metallic effect whilst also retaining enough of the original color of the image.

In some examples metallic effect print agents other than silver may be used such as gold print agent. This may give the combined image and graphic code a slightly gold hued appearance.

The example method 300 of FIG. 3 enables a metallic effect to be automatically added to a combined image and machine readable graphic code whilst maintaining the readability of the graphic code and the visual appearance of the image. Adding a metallic effect to a combined image and graphic code can help to reassure users (who may be scanning the graphic code as part of a mobile payment system) that the graphic code is authentic. Such a code may reduce fraud which can occur when an authentic graphic code is swapped for a graphic code that will transfer money to a person other than the intended recipient. In some examples, the method may further comprise printing the combined image and graphic code with the metallic effect.

Figure 4:
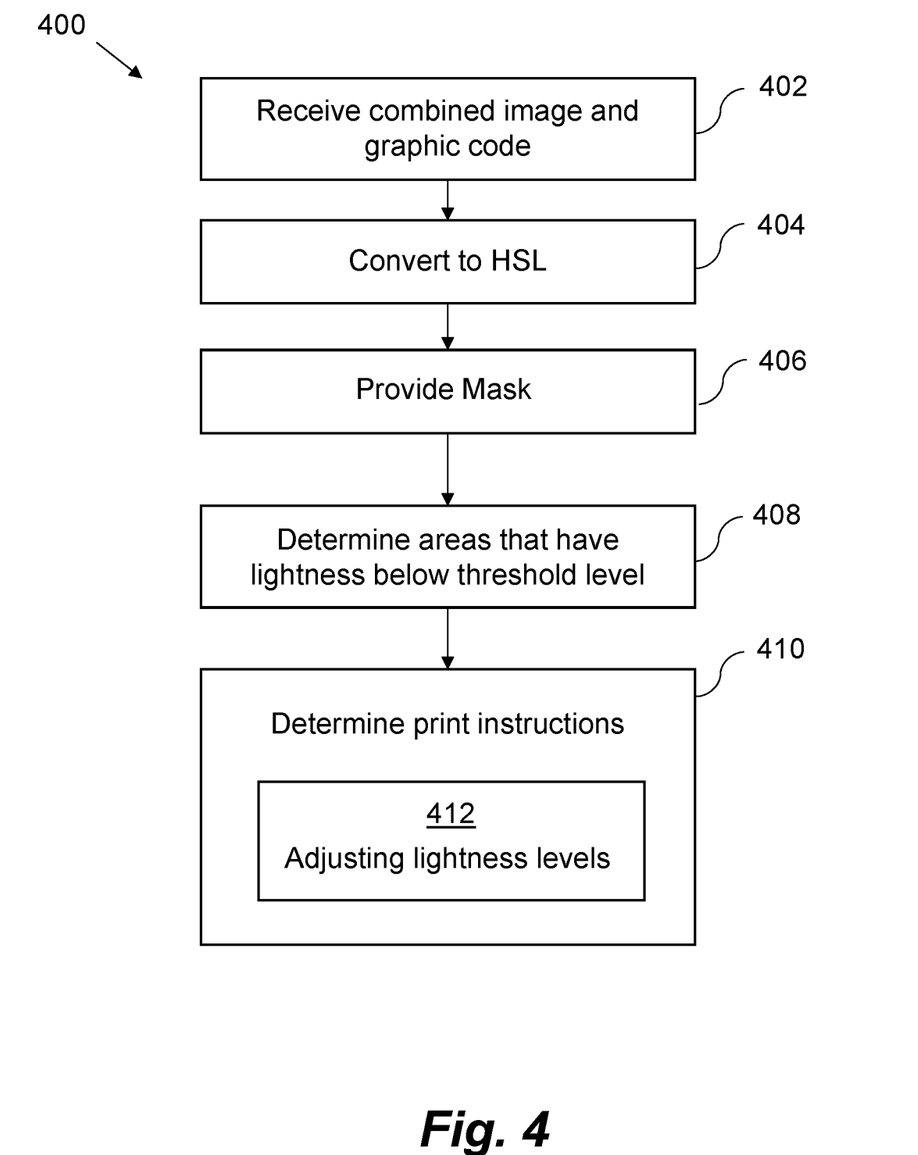
FIG. 4 shows a flowchart of another example method of producing a combined image and graphic code.

FIG. 4 shows another example method 400 for producing a combined image and machine readable graphic code. Block 402 comprises receiving a combined image and graphic code, as described previously in relation to FIG. 3. In some examples the combined image and graphic code may be received in a Red, Green, Blue (RGB) format (i.e. as an RGB image), Cyan, Magenta, Yellow, Black (CMYK) format or another color format. In some examples, the combined image and graphic code may be received in a Hue, Saturation, Lightness (HSL) format (i.e. as an HSL image).

Block 404 comprises, if the combined image and graphic code is received in a format other than HSL (for example, RGB), converting the combined image and graphic code to HSL format. Converting the image to HSL format enables the lightness of any particular pixel of the image to be readily determined and considered independently of the color (hue) or saturation.

Block 406 comprises providing a mask and applying the mask to the combined image and graphic code. A mask may delineate the extent of the combined image and graphic code which is to be associated with the metallic effect. One example process of defining and applying a mask is explained in more detail below in reference to FIG. 5.

Block 408 comprises determining areas that have a lightness level below a threshold level, as described previously in relation to FIG. 3. In the example shown in FIG. 4 however, as a mask has been defined, areas within the area or areas defined by the mask are analysed to determine whether any of the pixels in that area have a lightness level below the threshold level, while areas outside of the mask are not analysed.

Block 410 comprises determining print instructions for depositing a metallic pattern wherein solid areas of the metallic pattern correspond to the areas of the combined image and graphic code that have a lightness level below the threshold level. In this example, determining the print instructions includes block 412 comprises increasing the lightness levels of the combined image and graphic code in areas of the combined image and graphic code that are to be located above corresponding areas of the metallic pattern by an amount based on the lightness level of the metallic pattern to be deposited. In an example, if the metallic pattern is formed of silver print agent having a lightness level of 0.75, the lightness of areas of the combined image and graphic code that are to be aligned (i.e. co-located with) the metallic pattern may be adjusted by increasing the lightness level of pixels in these areas to compensate for the perceived decrease in lightness that will occur due to the combined image and graphic code being printed over the top of the metallic pattern. In this way the original lightness levels of the combined image and graphic code are maintained. Compensating for the decrease in lightness also assists in maintaining the readability of the combined image and graphic code, which may be based on a difference between lighter and darker areas.

Therefore, at block 412, for any pixel of the combined image and graphic code that will have a metallic under-print in this example, the lightness value will therefore be increased (towards white) to compensate for the reduction in lightness caused by the silver. The new lightness value of each pixel will be:

$$L_{new} = 1.0 - (L_{metal} - L_{pixel})$$

where $L_{metal}$ is the lightness value of the metallic print agent and $L_{pixel}$ is the lightness value of the pixel of the combined image and graphic code. In some examples, the lightness may be adjusted by an amount corresponding to the lightness of the metallic pattern (e.g. by 0.75 in the above example).

In examples where a mask has been defined, the determined print instructions for depositing a metallic pattern are for depositing the metallic pattern within an area or areas defined by the mask, which also have a lightness level below the threshold defined in block 408.

In some examples, the combined image and graphic code may be transformed into another color space, such as RGB, CMYK, or the like.

The method may further comprise printing the combined image.

Figure 5:
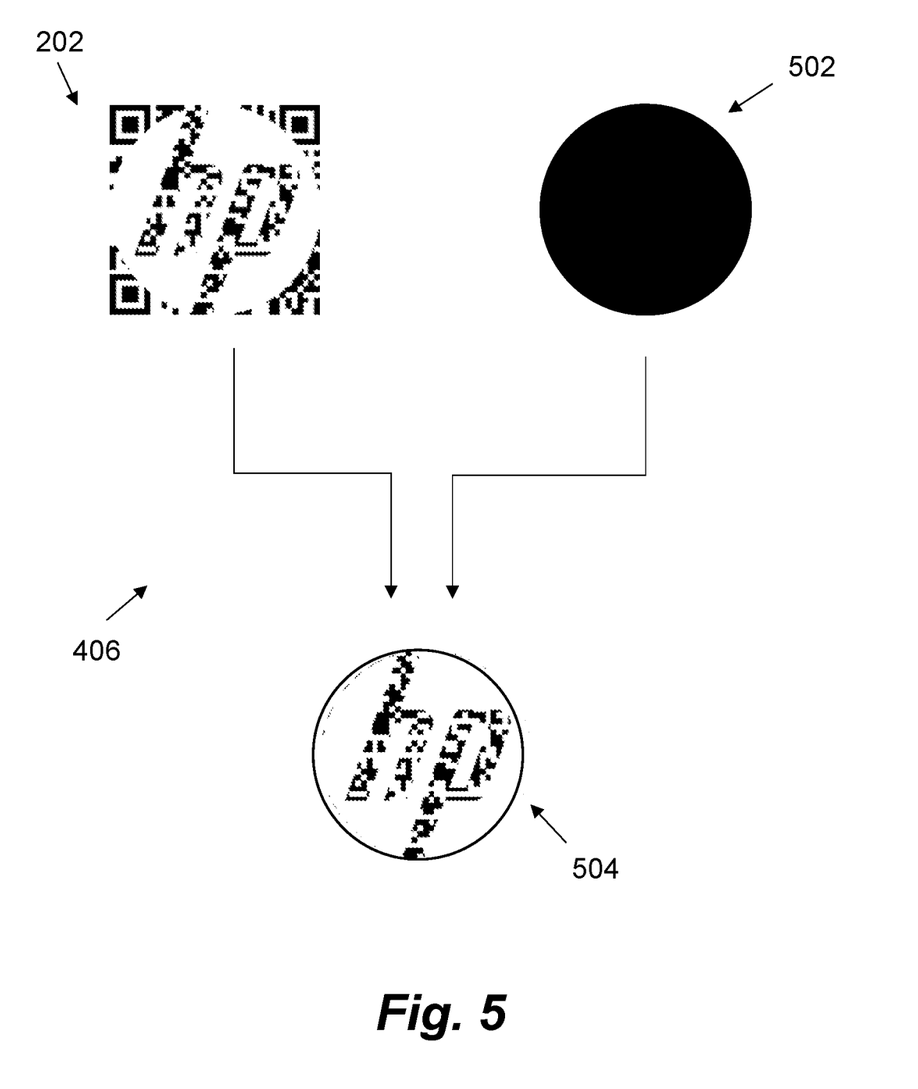
FIG. 5 shows a schematic representation of block 406 of FIG. 4.

FIG. 5 shows an example of block 406 in more detail. In block 406, a mask 502, which in this example defines a circular area, is provided. When the mask 502 is applied to the combined image and graphic code 202, this effectively crops the combined image and graphic code 202 to a circular area 504 having the same area and shape as the mask 502.

In some examples, any suitable size or shape mask may be used. If a mask is used that covers the whole combined image and graphic code, the combined image and graphic code will not be cropped (i.e. this will have the same effect as not providing a mask).

In some examples, the shape of the mask can be defined manually by a user. In some examples, providing the mask comprises: retrieving the image portion of the combined image and graphic code; applying a lightness threshold to the image; and cropping areas of the image that have a lightness above the threshold to form the mask. In some examples, retrieving the image portion of the combined image and graphic code may comprise retrieving a stored digital version of an original image from before it was combined with a graphic code. In some examples, retrieving the image portion of the combined image and graphic code may comprise performing image processing on the combined image and graphic code, for example, cropping the combined image and graphic code.

Using a mask enables the metallic effect to be kept to a particular area of the combined image and graphic code, which may provide an improved or particular visual impact on a user of the combined image and graphic code and may further increase the user's confidence that the code is authentic. For example, a metallic under print could be located underneath a brand logo or other recognisable symbol of authentication in the combined image and graphic code.

Figure 6:
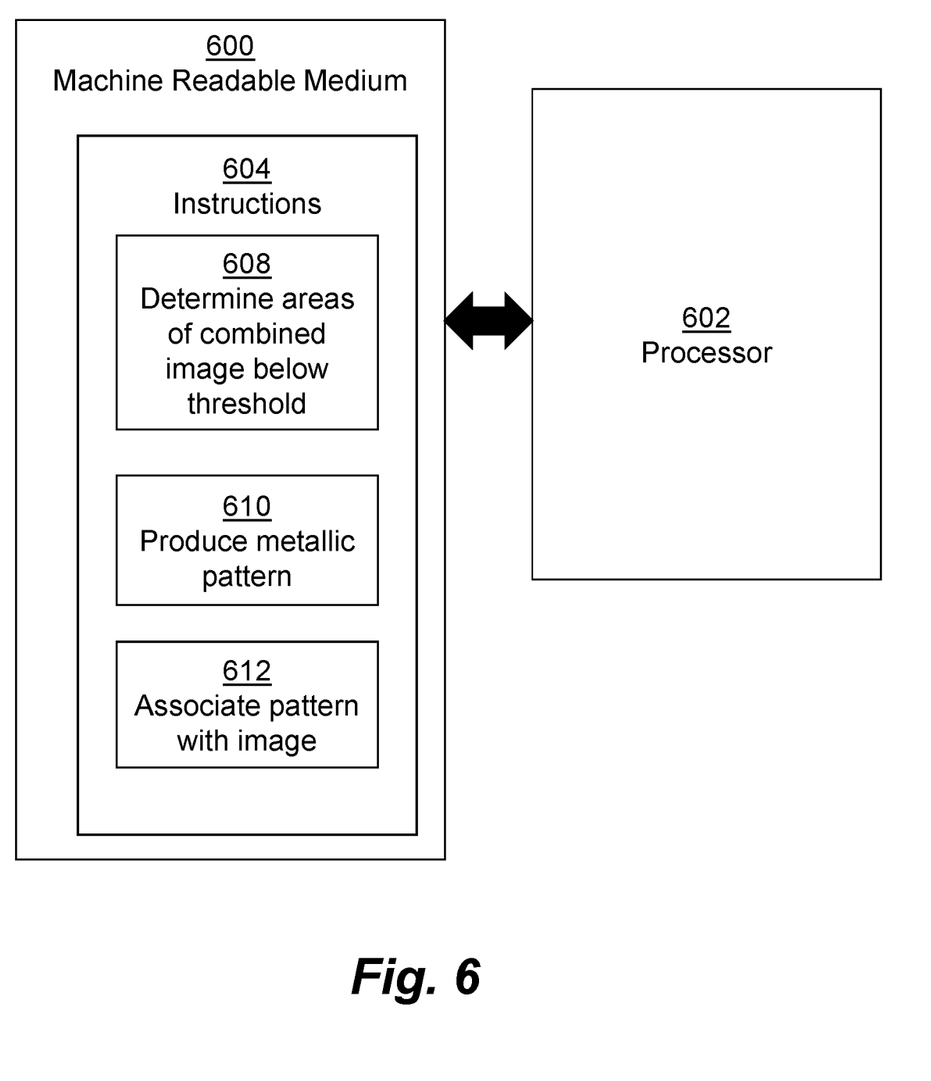
FIG. 6 shows an example of a machine readable medium in association with a processor.

FIG. 6 shows a tangible machine-readable medium 600, comprising a set of instructions 604 which, when executed by a processor 602 cause the processor 602 to perform a method. In an example, the tangible machined readable medium 600 comprises a set of instructions 604 including instructions 608, to, on receipt of an image combined with a machine readable graphic code, cause the processor determine areas of the combined image and graphic code that have a lightness level below a threshold level; instructions 610, to cause the processor to produce a metallic pattern wherein solid areas of the metallic pattern correspond to the areas of the combined image and graphic code that have a lightness level below the threshold level; wherein the threshold level is less than or equal to the lightness level of the deposited metallic pattern; and instructions 612, to cause the processor to associate the metallic pattern with the combined image and graphic code so that the determined areas of the combined image and graphic code that have a lightness below the threshold level are to be co-located with printed solid areas of the metallic pattern when printed.

In some examples, the tangible machine-readable medium 600, may comprise a set of instructions 604 which, when executed by a processor 602 cause the processor 602 to perform a method as described with reference to FIG. 3 or FIG. 4.

Figure 7:
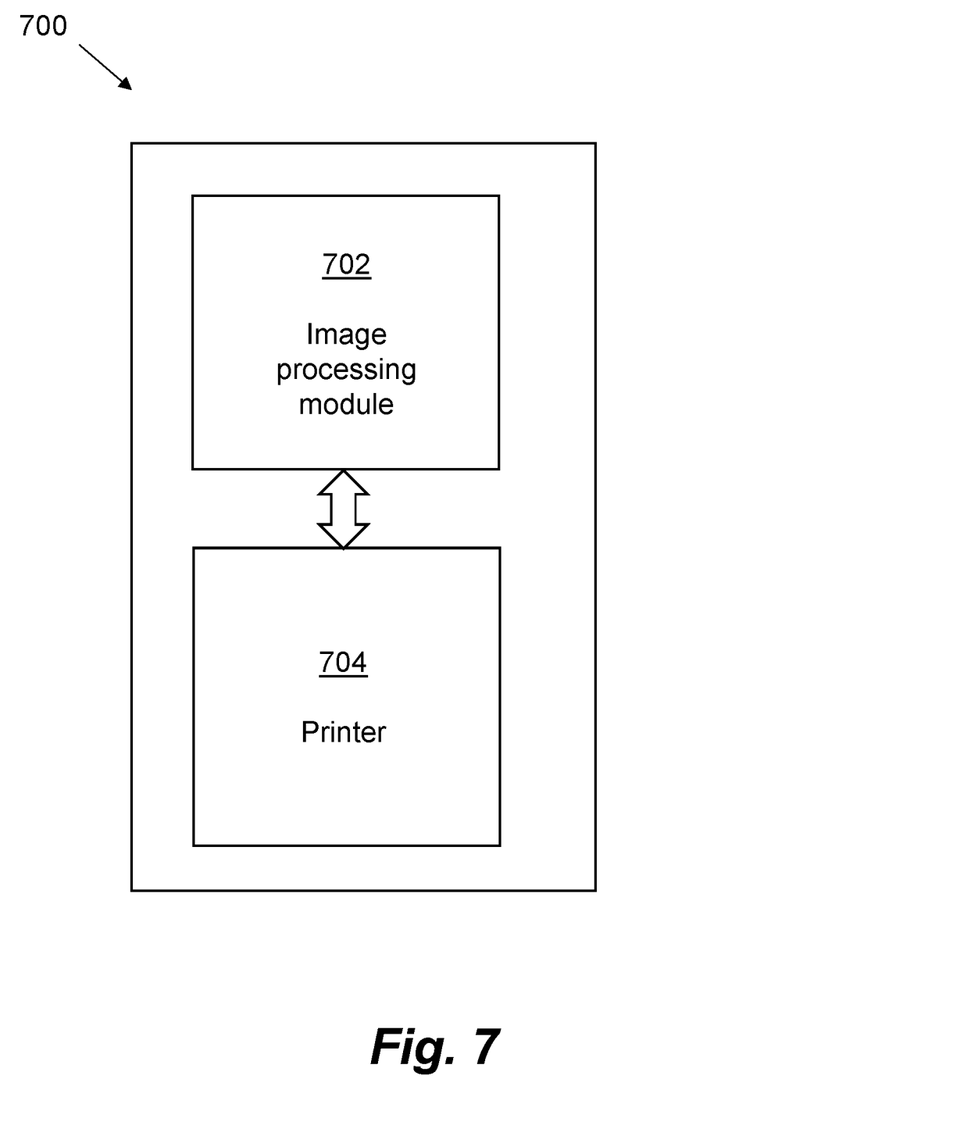
FIG. 7 shows a diagram of an example print apparatus.

FIG. 7 shows a print apparatus 700 to perform a method as described with reference to FIG. 3 or FIG. 4. In some examples, print apparatus 700 may comprise an image processing module 702 and a printer 704, in communication with the image processing module 702. The image processing module 702 is, in use of the print apparatus 700, to:

receive an image combined with a machine readable graphic code and determine areas of the combined image and graphic code that have a lightness level below a threshold level; and the printer 704 is, in use of the print apparatus 700, to: deposit a metallic pattern wherein solid areas of the metallic pattern correspond to the areas of the combined image and graphic code that have a lightness level below the threshold level; print the combined image and graphic code onto the metallic pattern so that the determined areas of the combined image and graphic code that have a lightness below the threshold level are co-located with the solid areas of the metallic pattern.

Producing a Combined Image and Machine Readable Graphic Code

An example of how a combined image and machine readable graphic code, such as that shown in FIG. 2B, can be produced is set out below. In other examples, the combined image and graphic code may be produced by another method. For example, where the graphic code comprises error correction features, such as redundant information-carrying areas of the code, such areas could be removed and replaced with an image. In other examples, the combined image and machine readable graphic code may be determined manually by a designer or the like.

In some examples, an image such as image 200 may be combined with a machine readable graphic code, such as QR code 120, by the following example method.

Figure 8A:
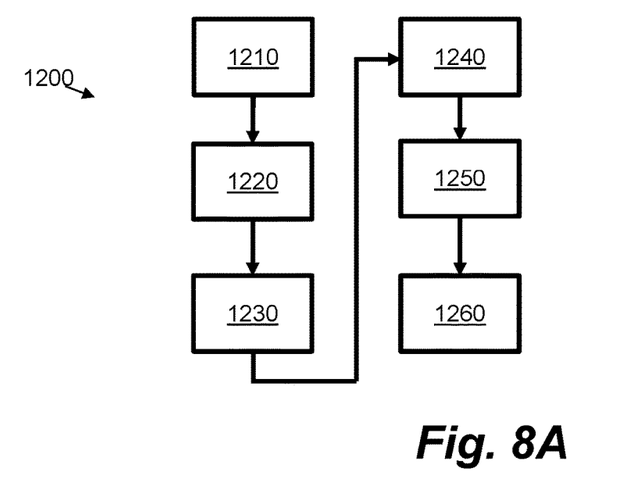
FIG. 8A shows a flowchart of an example method of combining an image with a machine readable graphic code.
Figure 8B:
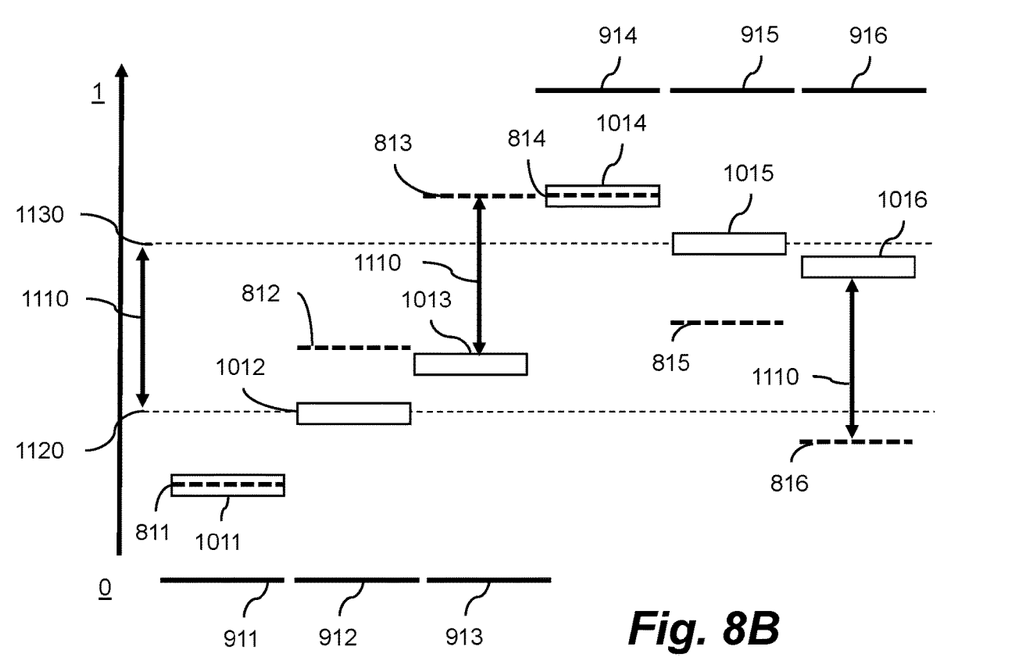
FIG. 8B shows a schematic graphical representation of features of the method of FIG. 8A.

FIG. 8A shows a flow chart representation of an example method 1200 comprising: at block 1210, providing, to a processor, or generating by the processor, an image file. In examples, the image file may represent an image in any suitable file format, such as GIF, PNG, TIFF, JPEG; at any color mode such as RGB or CMYK. The image may be provided to the processor from any suitable machine readable medium. At block 1220, the method 1200 comprises providing, to the processor, or generating by the processor, a machine readable graphic code comprising a plurality of light pixels and a plurality of dark pixels. Light and dark pixels of the graphic code will be referred to hereinafter as white and black graphic code pixels respectively for ease of reference. The machine readable graphic code is a representation which may be read optically by a computer. The machine readable code may be a one-dimensional, 1D, graphic code, such as a 1D barcode, such as a Universal Product Code, UPC, barcode. In other examples, the machine readable code is a two-dimensional, 2D, graphic code, such as a 2D barcode, a Quick Response code, i.e. QR code, or the like. The machine readable graphic code may be provided to the processor in any suitable format, for example any format suitable for encoding an image. In examples the machine readable graphic code is provided in lossless format encoded as, for example, GIF, PNG, TIFF or another suitable format. The abovementioned file can be encoded as a binary image, e.g. black and white, or in a color format using any color mode such as RGB or CMYK.

At block 1230, the method 1200 may comprise determining, using the processor, if the image is the same size as the graphic code, and if the image is not the same size as the graphic code, scaling or cropping the image or the graphic code to make the image the same size as the graphic code. In examples, at least a portion of the image is sized to the machine readable graphic code. For example, the combination of the image and the machine readable graphic code may be produced by changing the number of pixels of the image to match the number of pixels of the graphic code. Changing of the number of pixels of the image may be achieved by, for example, rescaling the image, or cropping the image. At block 1240, the method 1200 comprises associating, by the processor, each pixel of the machine readable graphic code with a corresponding pixel of the image, wherein each image pixel has a lightness. In examples, each pixel of the machine readable graphic code is associated with the image once the image has been resized to the size of the graphic code, if the image is resized. For example, if the graphic code and the image provided to/by the processor are the same size, for example comprising the same number of pixels, then in example methods no resizing may take place. As referred to herein, the term image pixel refers to a pixel of the image after any resizing has been done such that each image pixel is associated with a graphic code pixel.

In examples, the image is converted to a format having a lightness value, or a luminance value. In other examples, the image may be generated by or provided to the processor in a format having a lightness value. An example image format having a lightness value is Hue, Saturation, Lightness, HSL, format. Lightness may also be referred to as luminance, and may be a relative luminance. In examples of HSL used herein, lightness takes a value between and inclusive of 0, corresponding to black, and 1, corresponding to white. Hue may be considered to be the value which defines how an area appears to be similar to one of the perceived colors, e.g. a degree on a color wheel. Saturation can be considered to be the colorfulness of an area relative to its own brightness where saturation is between 0 and 1 inclusive, a saturation of 0 is a shade of gray and a saturation of 1 is full-color. In some examples, the method comprises converting the image from RGB format to HSL format.

At block 1250, the method 1200 comprises determining, by the processor, for each pixel of the image based on a comparison between the lightness of the pixel of the image and a lightness of the corresponding pixel of the graphic code, whether to adjust the lightness of the image pixel based on one of a low threshold lightness value and a high threshold lightness value. In examples, determining for each pixel of the image whether to adjust the lightness of the image pixel comprises: associating one of the lightness threshold values with the dark graphic code pixels and associating the other of the lightness threshold values with the light graphic code pixels, and: for an image pixel associated with a dark graphic code pixel, comparing the lightness of the image pixel to the associated lightness threshold value associated with the dark graphic code pixels, and adjusting the lightness of the image pixel or leaving the lightness of the image pixel unchanged based on a comparison between the lightness of the image pixel and the associated lightness threshold value; and for an image pixel associated with a light graphic code pixel, comparing the lightness of the image pixel to the threshold value associated with the light graphic code pixels, and adjusting the lightness of the image pixel or leaving the lightness of the image pixel unchanged based on a comparison between the lightness of the image pixel and the associated lightness threshold value.

In examples, the method at block 1250 comprises, for each image pixel, determining whether the associated graphic code pixel is white or black (or more generally whether the associated graphic code pixel is a 'lighter' or 'darker' pixel). In such examples, where the associated graphic code pixel is black, the lightness of the image pixel is compared to the low threshold lightness value. Where the associated graphic code pixel is white, the lightness of the image pixel is compared to the high threshold lightness value.

At block 1260, the method 1200 comprises adjusting, by the processor, the lightness value for each pixel of the image which is to be adjusted to a modified lightness value, such that a combination of the image and the graphic code is produced. In examples, adjusting the lightness of an image pixel, at block 1260, comprises adjusting the lightness of the image pixel to the threshold lightness value associated with the image pixel. In examples, adjusting the lightness of an image pixel comprises adjusting the lightness of the image pixel towards the lightness threshold associated with the image pixel, by the lesser of: the difference between the image pixel lightness and the associated threshold lightness, and a predetermined value, as will be discussed in more detail below. Thus the graphic code may be 'written into' the image.

In summary, if an image pixel is to be associated with a black code pixel, but its lightness value is higher than the lower threshold, then it may be determined that the pixel is too light for the code to be read accurately, and the lightness of that pixel may be reduced. If however an image pixel is to be associated with a white code pixel, but its lightness value is lower than higher threshold, then the lightness of that pixel may be increased, so that the pixel can be correctly recognized as a light portion of the code.

In examples, the method comprises for each white pixel of the machine readable graphic code, comparing the lightness value of the image pixel to the high threshold lightness value, and: leaving the lightness value of the image pixel unchanged where the lightness value of the image pixel is greater than or equal to the high threshold lightness value, and increasing the lightness value of the pixel of the image to a modified lightness value where the lightness value of the image pixel is less than the high threshold lightness value. In examples, the modified lightness value for an image pixel associated with a white graphic code pixel is equal to the high threshold lightness value. As such: if the image pixel lightness of the image pixel associated with a white graphic code pixel is less than the high lightness threshold, it is modified to the high lightness threshold; and if the image pixel lightness is greater than or equal to the high lightness threshold the lightness is left unchanged. In other examples, the lightness value of the image pixel is increased by the lesser of: the difference between the image pixel lightness and the high threshold lightness; and a predetermined maximum value. The predetermined maximum value may in some examples be the difference between the high lightness threshold and the low lightness threshold, which is termed herein "delta lightness". In such examples, the modified lightness value for an image pixel associated with a white graphic code pixel is equal to the image pixel lightness plus the predetermined value, e.g. image pixel lightness plus delta lightness.

In examples, the method at block 1260 comprises, for each image pixel associated with a black pixel of the graphic code, comparing the lightness of the image pixel to the low threshold lightness value, and: leaving the lightness value of the image pixel unchanged where the lightness value of the image pixel is less than or equal to the low threshold lightness value, and decreasing the lightness value of the image pixel of the image to a modified lightness value where the lightness value of the image pixel is greater than the low threshold lightness value. In examples, the modified lightness value for an image pixel associated with a black graphic code pixel is equal to the low threshold lightness value. Similarly to as described for an image pixel associated with a white graphic code pixel, in other examples, when the lightness value of the image pixel is decreased, it is decreased by the lesser of: the difference between the image pixel lightness and the low threshold; and a predetermined maximum value, e.g. delta lightness. As such, in some examples, the modified lightness value for an image pixel associated with a black graphic code pixel is equal to the image pixel lightness minus the predetermined value, e.g. image pixel lightness minus delta lightness.

In examples, modifying the lightness values of pixels as described in the preceding paragraphs provides a version of the image which is modified based on the graphic code, such that the modified version of the image may be successfully read by a machine, to function to impart information encoded in the original graphic code. In example methods, by adjusting the lightness of pixels in the image, light areas and dark areas are produced in the modified image which correspond to the white areas and dark areas of the machine readable code. In examples, the values of the high threshold lightness value and the low threshold lightness value are predetermined to provide a suitable contrast between light areas and dark areas of the combined image and graphic code. The contrast may be set such that the combination of the image and the graphic code is readable as a graphic code by a machine. For example, where lightness takes relative luminance, or lightness, values between 0 and 1 inclusive, the low threshold lightness value may be set at or around 0.3, for example between 0.2 and 0.4, while the high threshold lightness value may be set at or around 0.7, for example between 0.6 and 0.8. In examples, this allows the data encoded in the original graphic code to be read from the combination of image and graphic code. It will be appreciated that, in some examples, the lightness level of one dark area of the code may differ from the lightness level of another dark area of the code (and that the same is true for darker areas).

In examples, a graphic code combined with an image according to example methods may comprise error correction features, as mentioned above. The error correction features may contribute to retaining readability of the information encoded by the graphic code from the modified image. For example, a greater error correction level present in the original graphic code may allow for lesser contrast in the modified image between the light and dark areas, which may allow a user to more easily perceive the image. A graphic code may be generated taking into account the image with which it is to be combined, and an error correction level may be set accordingly to allow the combined image and code to be read correctly. Adjusting the lightness value of pixels of the image based on the associated pixels of the graphic code allows the combined image and graphic code to be produced by making pixels lighter or darker without changing their color. As such, a single parameter, lightness, may be changed to make the adjustment to each pixel.

Example methods may further comprise converting the combination of image and graphic code into a different format, for example RGB or CMYK. As such, in some examples, the original image may be received in an RGB format, converted to HSL for the production of the combined graphic code and image, and the combined graphic code and image then converted to RGB. This may provide for compatibility with other programs and/or devices. In examples, the resulting combined graphic code and image may be displayed by a suitable display device, such as a smart phone screen or a computer monitor. In examples the resulting combined graphic code and image may be printed onto a medium.

FIG. 8B shows a schematic representation of elements of an example method of producing a combination of a machine readable graphic code and an image, to be implemented by a processor. In FIG. 8B, the vertical axis represents the magnitude of pixel lightness, wherein lightness has possible values between and including 0, corresponding to black, and 1, corresponding to white. Pixels of the image, machine readable graphic code, and the combination of the image and the graphic code are represented along the horizontal. Pixels of the machine readable graphic code are represented as solid lines 911-916, pixels of the image are represented by dashed lines 811-816, and pixels of the combination of the graphic code and the image are represented as blocks 1011-1016. Low threshold lightness value 1120 and high threshold lightness value 1130 are shown by dashed lines.

A portion of the graphic code is shown, in this example six pixels 911-916 are represented wherein first, second and third graphic code pixels 911-913 are black, having a lightness of 0, and fourth, fifth and sixth graphic code pixels 914-916 are white, having a lightness of 1. In the example method, the processor associates the first image pixel 811 with the first graphic code pixel 911, and determines that the first graphic code pixel 911 is associated with a black pixel. The lightness of first image pixel 811 is compared to the low threshold value 1120 to determine whether the lightness of first image pixel 811 is below or equal to the low threshold value 1120. In this case, it is determined that the lightness of the first image pixel 811 is below the low threshold value 1120, and, since the first image pixel 811 is associated with black first pixel 911, the lightness value of the first image pixel 811 is left unchanged. The first graphic code and image combination pixel 1011 therefore has a lightness value equal to that of the first pixel 811.

Continuing for the second image pixel 812, the second graphic code pixel 912, associated with the first image pixel 812, is black, therefore second image pixel 812 is compared to the low threshold 1120. It is determined that the second image pixel 812 has a lightness greater than the low threshold 1120, therefore a modification to the lightness value of the second image pixel 812 is made to produce the lightness value of the second combination pixel 1012. In this example, the lightness of the second combination pixel 1012 is set at the low threshold 1120, since the associated graphic code pixel 912 is black and the image pixel lightness is greater than the low threshold 1120.

The third image pixel 813 has a lightness greater than the low threshold 1120 and is associated with a third graphic code pixel 913. Third graphic code pixel 913 is black. Therefore, the lightness of the third image pixel 813 is compared with the low threshold 1120. In the case of third image pixel 813, it is determined that the lightness of image pixel 813 is greater than the low threshold 1120. In some examples of the method described herein, in the case of a pixel such as third image pixel 813, i.e. where the lightness of an image pixel associated with a black graphic code pixel is found to be greater than the low threshold, the lightness of the associated combination pixel is set at the low threshold 1120. However, in the example method shown by FIG. 8B, since it is determined that the lightness of image pixel 813 is above the low threshold 1120, the resulting pixel 1013 is set at a lightness of the greater of: the low threshold 1120, and the lightness of image pixel 813 minus a predetermined value. In this example the predetermined value is delta lightness 1110, i.e. the difference between high lightness threshold 1130 and low lightness threshold 1120. In this case, the lightness of the image pixel 813 minus delta lightness 1110 is greater than the low threshold 1120, and the lightness of image pixel 813 is thus decreased by delta lightness 1110 to give the modified lightness of the combination pixel 1013. In other words, in this example a maximum difference between the lightness of an image pixel and the lightness of a resulting combination pixel is set at a predetermined maximum value, delta lightness 1110. In other examples, the predetermined maximum value may be set independently of the high threshold 1130 and the low threshold 1120. For example, the predetermined maximum value may be determined to define a maximum contrast in lightness between adjacent pixels. The high threshold value 1130, low threshold value 1120, and the predetermined maximum value, may be chosen such that the resulting combination of graphic code and image has suitable readability by a device which reads the resulting code. Furthermore, setting a predetermined maximum value as in the example method of FIG. 8B may allow the image to be more easily perceptible to a user viewing the resulting combination of image and graphic code.

Fourth image pixel 814 is white and is associated with fourth graphic code pixel 914. Therefore, in the example method, the lightness of fourth image pixel 914 is compared to the high threshold 1130. It is determined that the lightness of fourth image pixel 814 is greater than the high threshold 1130. The lightness of the fourth combination pixel 1014 is therefore set to the lightness of the fourth image pixel 814.

Fifth image pixel 815 is associated with fifth graphic code pixel 915. Fifth graphic code pixel 915 is white. The lightness of fifth image pixel 1015 is compared to the high lightness threshold 1130 and is found to be less than high threshold 1130. Furthermore, the difference between lightness of fifth image pixel 815 and the high threshold 1130 is determined to be less than delta lightness 1110. As such, the lightness of the fifth combination pixel 1015 is set at the high threshold 1130.

Sixth image pixel 816 is associated with sixth graphic code pixel 916. Sixth graphic code pixel 916 is white. The lightness of sixth image pixel 1016 is compared to the high lightness threshold 1130 and is found to be less than high threshold 1130. The difference between sixth image pixel 816 and the high threshold 1130 is found to be greater than delta lightness 1110. As such, in the example of FIG. 3, the lightness of the sixth combined pixel 1016 is set at a lightness value equal to the lightness of sixth image pixel 816 plus delta lightness 1110. Similarly to the method as mentioned above, in other examples, where the lightness of an image pixel associated with a white graphic code pixel is found to be less than the high threshold, the lightness of the resulting combined pixel is set at the high threshold. For example, in such an example method, the lightness of the sixth combination pixel 1016 may be set at the high threshold 1130.

As described above, in implementing example methods described herein, lightness values of image pixels in HSL format are modified to produce modified pixels. The hue value of the pixel is left unchanged. In some examples, an image pixel with an initially high lightness value may be associated with a black graphic code pixel. In such examples, according to example methods the lightness value of the image pixel is decreased, for example to the low lightness threshold or, in other examples, decreased by a maximum of delta lightness. In some examples, the hue of the pixel may be such that when the lightness of the pixel is decreased, a color of the pixel is exaggerated in terms of its perceptibility by a viewer. For example, a light pixel may appear off-white in the original image but have a red hue.

When in this example the lightness is decreased, the pixel may appear as a bright red color, due to the red hue being exaggerated by the decrease in lightness. This effect may result in visible color artefacts in the resulting combined image and graphic code.

In example methods, the above-described color artefacts are reduced by modifying the saturation value of a pixel based on the lightness value of the pixel. For example, for an image pixel associated with a black graphic code pixel, a first predetermined lightness value may be set; if the lightness of the image pixel exceeds the first predetermined lightness value then the saturation value of the combined graphic code and image pixel produced by the method is reduced. For an image pixel associated with a white graphic code pixel, a second predetermined lightness value may be set; if the lightness of the image pixel is less than the second predetermined lightness value, then the saturation value of the combined graphic code and image pixel produced from the image pixel is reduced. In such examples, the saturation value may be reduced to a predetermined value, or may be reduced in a non-linear manner. In an example, the saturation value is reduced by dividing the original saturation value by a predetermined decay value. In examples, the first predetermined lightness value may be at or around 0.6, 0.7, 0.8 or 0.9. The second predetermined lightness value may be at or around, for example, 0.4, 0.3, 0.2, or 0.1. The decay value may be, for example, equal to 1.5, 2, 2.5, or 3.

To describe an example of a method comprising reduction of saturation as described above, in this example, the first predetermined lightness value is 0.6, the second predetermined lightness value is 0.4, and the decay value is 2. In the same example, the low threshold lightness value is 0.3 and the high threshold lightness value is 0.7. In this example, an image pixel having a lightness of 0.7 and a saturation value S is associated with a black graphic code pixel. According to the method, a combined image and graphic code pixel is produced by reducing the lightness of the image pixel from 0.7 to the low threshold 0.3. In this example, the image pixel lightness is greater than the first predetermined lightness of 0.6, and thus, the saturation of the combined image and graphic code pixel is S/(decay value)=S/2. As such, applying this example method, from an image pixel having a lightness 0.7 and saturation S and a black graphic code pixel, a combined image and graphic code pixel is produced having a lightness value 0.3 and a saturation value S/2. In examples, the hue value is left unaltered. In the same example method, an image pixel having a lightness of 0.3 and saturation S is associated with a white graphic code pixel. Since the lightness of the image pixel is less than 0.4, applying the example method to this pixel results in a combined image and graphic code pixel having a lightness value of 0.7 and saturation S/2.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that blocks in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams (for example, the processor 602 and/or the image processing module 702). In particular, a processor or processing apparatus may execute the machine readable instructions. Thus functional modules of the apparatus and devices (for example, the image processing module 702) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage (for example, the machine readable medium 600) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the abovementioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims and/or with any other dependent claim(s).

The invention claimed is:
1. A method comprising:
receiving, at a processor, a digital version of an image combined with a machine readable graphic code;
determining, by a processor, areas of the combined image and graphic code that have a lightness level below a threshold level; and determining, by a processor, print instructions for depositing a metallic pattern wherein solid areas of the metallic pattern correspond to the areas of the combined image and graphic code that have a lightness level below the threshold level.

2. A method according to claim 1, determining areas of the combined image and graphic code that have a lightness level below a threshold level comprises determining areas of the combined image and graphic code that have a lightness level below a threshold level which is less than or equal to a lightness level of the metallic pattern when deposited on a substrate.

3. A method according to claim 2 wherein the threshold level is set at a lightness level between 0.20 and 0.30 relative luminance less than the lightness level of the metallic pattern when deposited on a substrate.

4. A method according to claim 1, wherein determining the print instructions comprises increasing lightness levels of the combined image and graphic code in areas of the combined image and graphic code that are to be located above corresponding areas of the metallic pattern by an amount based on a lightness level of the metallic pattern to be deposited.

5. A method according to claim 1, further comprising providing a mask and applying the mask to the combined image and graphic code by cropping the combined image and graphic code to a shape and area defined by the mask, such that in the determined print instructions to print solid areas of the metallic pattern are within the shape and area defined by the mask.

6. A method according to claim 5, wherein providing the mask comprises:
retrieving an image portion of the combined image and graphic code;
applying a lightness threshold to the image; and
cropping areas of the image that have a lightness above the lightness threshold to form the mask.

7. A method according to claim 1, wherein the machine readable graphic code is a Quick Response (QR) code, a Data Matrix (DM), or a Barcode.

8. A method according to claim 1, wherein determining areas of the combined image and graphic code that have a lightness level below a threshold level comprises converting the combined image and graphic code from a CMYK or RGB image to a Hue, Saturation, Lightness (HSL) image and wherein determining the print instructions includes converting the HSL image to a CMYK or RBG image.

9. A method according to claim 1, further comprising printing the combined image and graphic code onto the metallic pattern so that the determined areas of the combined image and graphic code that have a lightness below the threshold level are to be co-located with solid areas of the metallic pattern.

10. A tangible machine-readable medium, comprising a set of instructions which when executed by a processor cause the processor to:
on receipt of an image combined with a machine readable graphic code, determine areas of the combined image and graphic code that have a lightness level below a threshold level;
produce a metallic print agent pattern to be deposited on a substrate wherein solid areas of the metallic print agent pattern correspond to the areas of the combined image and graphic code that have a lightness level below the threshold level;
wherein the threshold level is less than or equal to the lightness level of the metallic print agent pattern when deposited on the substrate; and
associate the metallic print agent pattern with the combined image and graphic code so that the determined areas of the combined image and graphic code that have a lightness below the threshold level are to be co-located with solid areas of the metallic print agent pattern when printed.

11. A tangible machine-readable medium according to claim 10 further comprising instructions to cause the processor to increase lightness levels of the combined image and graphic code in areas of the combined image and graphic code that are to be located above corresponding areas of the metallic print agent pattern by an amount based on the lightness level of the metallic print agent pattern to be deposited.

12. A tangible machine-readable medium according to claim 10 further comprising instructions to cause the processor to produce a mask for the combined image and graphic code, the mask defining an area in the combined image and graphic code, and wherein producing the metallic print agent pattern comprises further preventing deposition of solid areas of the metallic print agent pattern outside the area defined by the mask.

13. A print apparatus comprising
an image processing module to:
receive an image combined with a machine readable graphic code; and
determine areas of the combined image and graphic code that have a lightness level below a threshold level; the print apparatus further comprising
a printer to:
deposit a metallic pattern wherein solid areas of the metallic pattern correspond to the areas of the combined image and graphic code that have a lightness level below the threshold level; and
print the combined image and graphic code onto the metallic pattern so that the determined areas of the combined image and graphic code that have a lightness below the threshold level are co-located with the solid areas of the metallic pattern.

14. A print apparatus according to claim 13 wherein the threshold level is less than or equal to the lightness level of the metallic pattern when deposited.

15. A print apparatus according to claim 13 wherein the image processing module is further to increase lightness levels of the combined image and graphic code in areas of the combined image and graphic code that are to be located above corresponding areas of the metallic pattern by an amount based on the lightness level of the metallic pattern to be deposited.

* * * * *